A. R. HURST.
Manure Fork.
No. 11,610.
Patented Aug. 29, 1854.
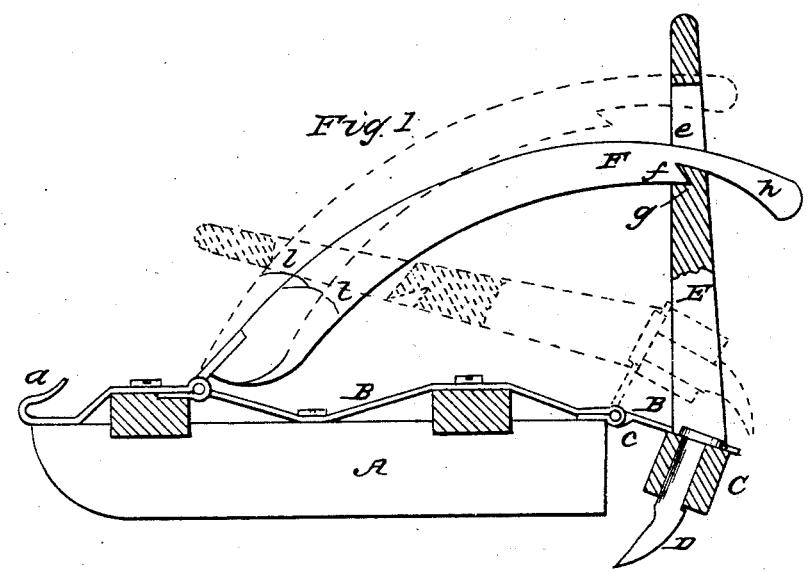
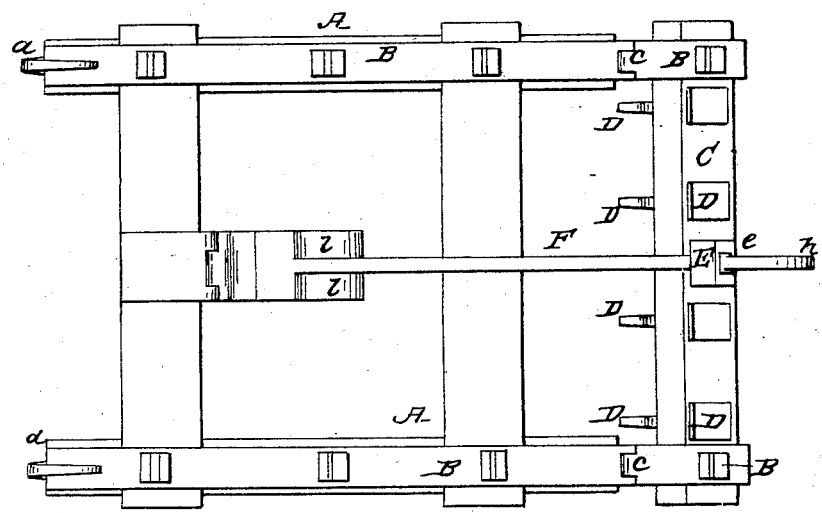

UNITED STATES PATENT OFFICE.

ABRAHAM R. HURST, OF HARRISBURG, PENNSYLVANIA.

IMPROVEMENT IN MANURE-EXCAVATORS.

Specification forming part of Letters Patent No. 11,610, dated August 29, 1854.

*To all whom it may concern:*

Be it known that I, ABRAHAM R. HURST, of Harrisburg, in the county of Dauphin and State of Pennsylvania, have invented a new and useful Improvement in Manure - Excavators; and I do hereby declare that the following is a full, clear, and exact description of the same, reference being had to the accompanying drawings, forming part of this specification, in which.

Figure 1 is a vertical longitudinal section of the manure-excavator, it being shown by black lines in operation and by red lines out of operation. Fig. 2 is a plan or top view of the same.

Similar letters of reference in each of the two figures indicate corresponding parts.

Handling manure for the purpose of loosening and separating its particles so that it may be shoveled is a very difficult and laborious job with the implements commonly used for the purpose.

My invention relates to a new and useful improvement in said implements, whereby the manure can be loosened and its particles separated, ready for shoveling, with ease and dispatch.

The nature of my invention consists in attaching a strong durable implement, very similar in construction to an ordinary pitchfork, to the hindmost part of a sled, having suitable attachments to render the implement effective in its operation, by hinge-joints in such a manner that its teeth can be adjusted so as to be caused to take a strong hold on the manure as the sled is drawn forward, and consequently to loosen and separate its particles in the most effectual and speedy manner, and when not excavating can be adjusted so as not to come in contact with the surface of the ground.

To enable others skilled in the art to make and use my invention, I will proceed to describe its construction and operation.

A in the accompanying drawings represents the sled strongly braced by the iron straps B B, each of which terminates at its front end in a hook, *a*, to which the power is attached.

C is the swinging cross-bar, which has the excavating or separating teeth D secured in it, as shown in Fig. 1. This bar is hinged to the sled by joints *c c*, and is capable of swinging on said joints when necessary. The teeth D may be placed at any suitable distance apart, and may extend from one side of the sled to the other, as shown in Fig. 2.

E is an upright lever for throwing the teeth in operation. It is attached to the swinging cross-bar C, as shown in Fig. 1. *e* is a slot cut through said lever.

F is a curved swinging stop-bar for keeping the lever E in place while the excavating operation is being carried on. The bar F moves in the slot *e* of the lever E, and holds the said lever in the position shown in black in Fig. 1 by means of the stop *f*, which fits in the recess *g* in the lever, as shown clearly in the drawings, Fig. 1. By means of this lever it may be seen that when the resistance is greatest on the teeth the operation of the bar as a stop is the most effective. The lever E can be depressed and the teeth thrown out of operation by moving the end *h* of the bar F to the position shown in red, Fig. 1, this operation drawing the stop *f* out of the recess *g*. The position of the teeth when elevated or out of operation will be seen in red in Fig. 1 and their position when in operation in black lines in the same figure. The lever E rests on the shoulders *i i* of the bar F when the teeth are not in operation.

The teeth of the implement are forced into the manure, and the sled is drawn over the same by hand or horse power, the former, as the latter is drawn forward, taking a firm hold upon a large portion of the manure, and loosens and separates its particles, ready for shoveling.

It must be evident that a very much greater quantity of manure can be effectually loosened and separated in a given time with less expenditure of labor with this implement than by others in use.

I am aware that a device similar to the toothed bar C has been employed in harrows and cultivators, and therefore I do not claim the same as used in such implements; but

What I claim as my invention, and desire to secure by Letters Patent, is—

The combination and arrangement of the swinging toothed cross-bar C, carriage A, and swinging stop-bar F, so as to form an implement for excavating or loosening and separating the particles of manure with ease and facility, substantially as herein described.

ABRAHAM R. HURST.

Witnesses:
HENRY BEADER,
JNO. T. HURST.